Jan. 10, 1933. J. M. McGREGOR ET AL 1,893,901
SEALING TOOL
Filed March 13, 1931 2 Sheets-Sheet 1
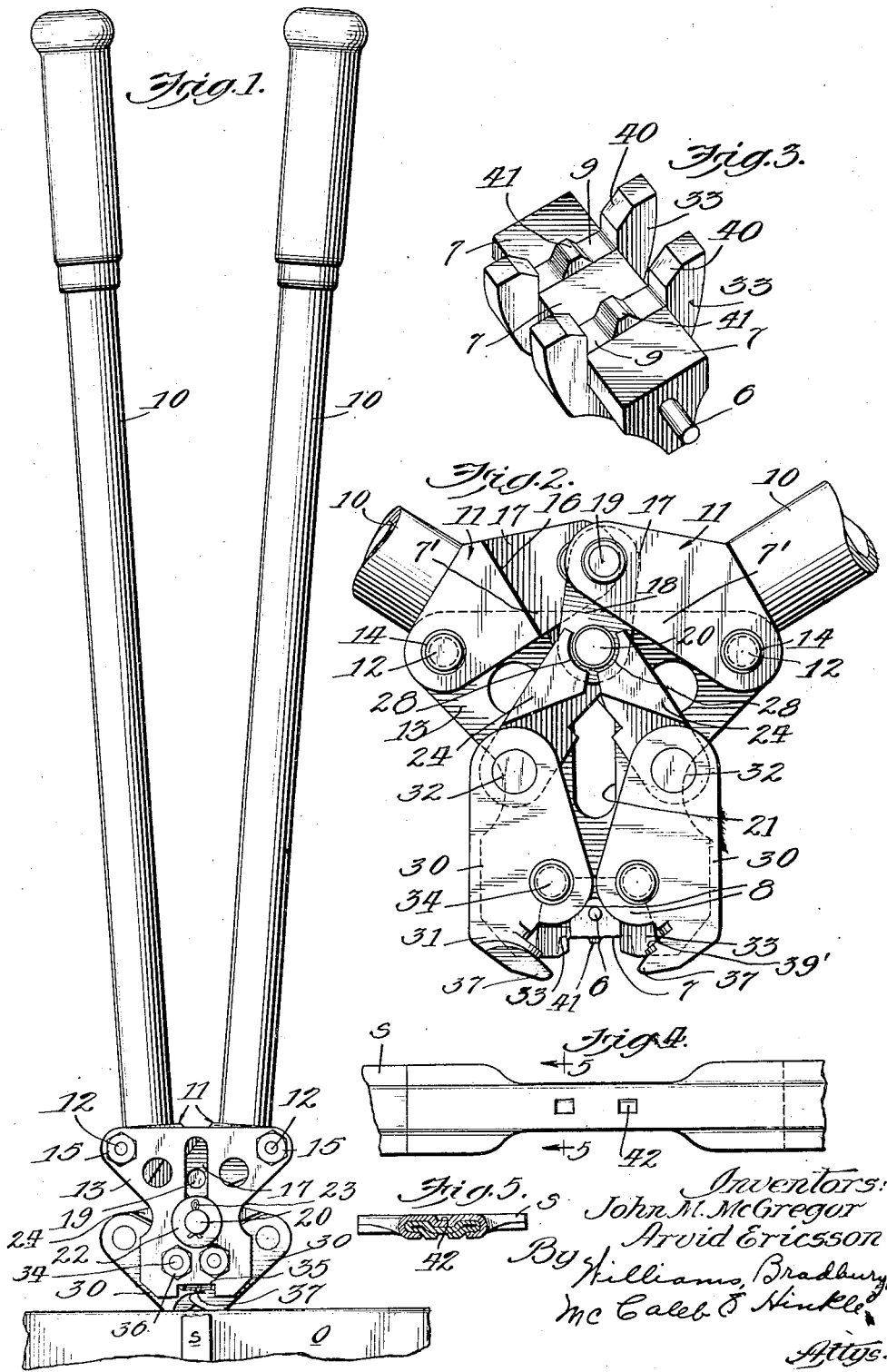

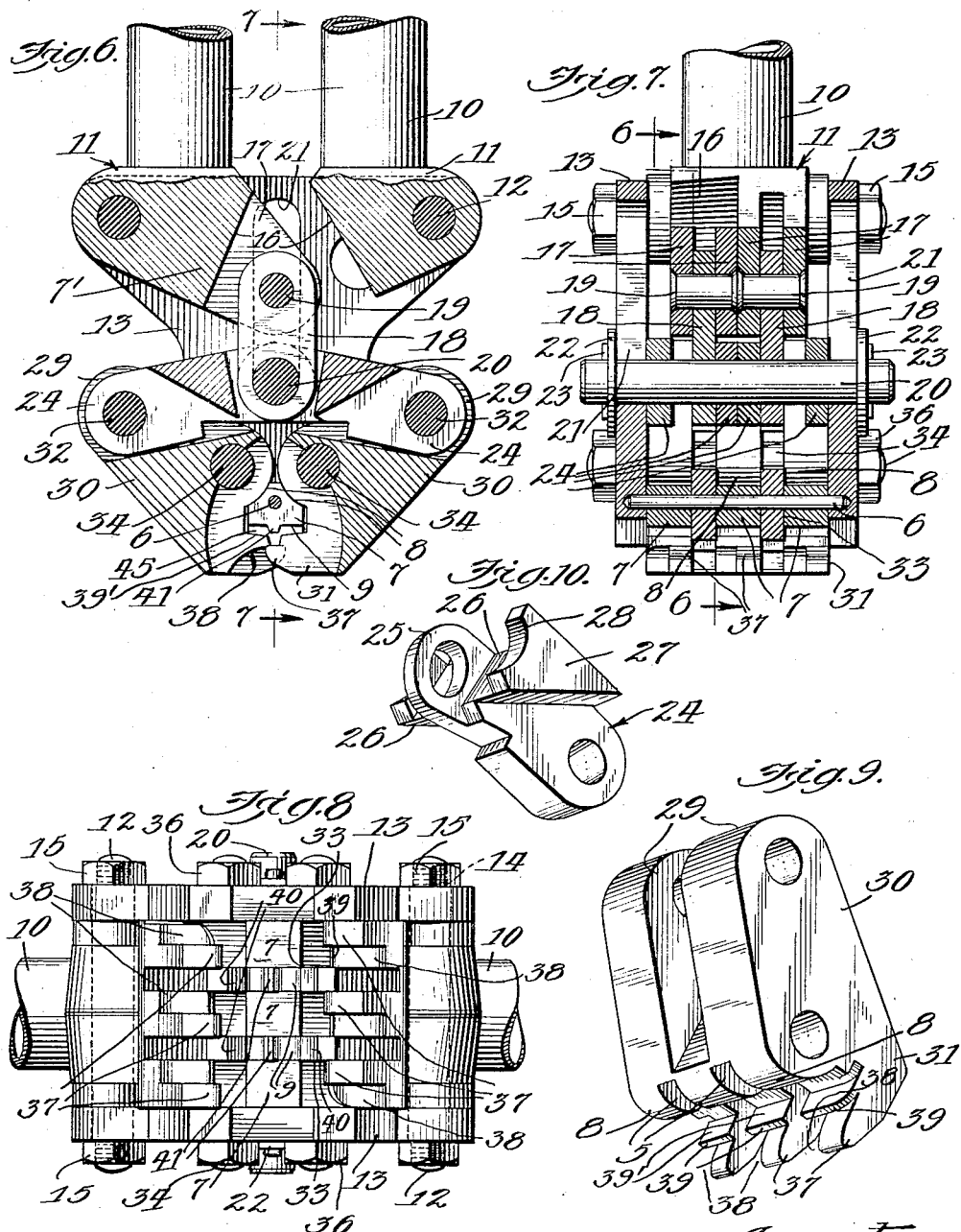

Patented Jan. 10, 1933

1,893,901

UNITED STATES PATENT OFFICE

JOHN M. McGREGOR AND ARVID ERICSSON, OF CHICAGO, ILLINOIS, ASSIGNORS TO SIGNODE STEEL STRAPPING COMPANY, OF CHICAGO, ILLINOIS, A CORPORATION OF DELAWARE

SEALING TOOL

Application filed March 13, 1931. Serial No. 522,326.

This invention relates to sealing tools. It will be described as embodied in a tool adapted to seal together the overlapped ends of metal band strapping used for binding together various objects or for forming packages and the like.

An object of the invention is the provision of a tool of the type above identified which is adapted to positively and permanently interlock and seal together the overlapped ends of metal strapping, without the necessity of employing a sleeving element.

Another object of this invention is the provision of such a tool which will form a seal, the elements of which will not be mutually wedged apart by tensional strain and which have opposed interlocking lugs to withstand tensional stress and prevent relative movement of the overlapped strap ends.

A further object is the provision of such a tool adapted to form a relatively flat seal having the characteristics above set forth.

Another object is the provision of a sealing tool having novel jaws and pressure blocks for operating on the metal strapping, and improved toggle mechanism for operating the jaws in unison and in equal degree and positively with great force by exerting a relatively small force on the operating handles.

Other objects and advantages will appear as the description proceeds.

In the accompanying drawings,

Fig. 1 is a side elevation of a sealing tool in applied position;

Fig. 2 is an enlarged fragmentary elevation of the tool with one side plate removed to better illustrate the toggle mechanism;

Fig. 3 is a perspective view of the compound pressure block employed in the tool;

Fig. 4 is a plan view of a seal joint produced by the tool;

Fig. 5 is a section taken on the line 5—5 of Fig. 4;

Fig. 6 is an enlarged fragmentary longitudinal section showing the jaws in deforming position and taken on the line 6—6 of Fig. 7;

Fig. 7 is a vertical section taken on substantially the line 7—7 of Fig. 6;

Fig. 8 is a bottom plan view of the sealing tool with the handles broken off and with the jaws in open position;

Fig. 9 is a perspective view of one of the jaws removed from the tool; and

Fig. 10 is a perspective view of one of the toggle links which actuate the jaws.

Referring to the drawings in detail, the sealing tool is shown comprising a pair of handles 10, preferably tubular and connected at their forward ends to blocks 11, producing in conjunction therewith levers 7' which are pivoted independently at 12 between a pair of side plates 13 adjacent the corners of the widened inner ends thereof. These pivots are preferably in the form of bolts with their end portions extending through openings in the plates and having reduced end portions forming shoulders 14 which are engaged by nuts 15 on the reduced threaded ends to prevent binding engagement of the bolts with the levers. The blocks 11 are duplicates and interchangeable, each being cut away at one side as indicated at 16 while the opposite side is extended angularly and provided with a pair of apertured ears 17 resulting from the bifurcation of this end. Links 18 are pivoted between each pair of ears 17 as indicated at 19 so as to have relatively independent movement during the opening and closing of the handles upon spaced centers, and these links are in turn pivotally connected to a transverse pin 20 which has its ends projecting through slots 21 in the side plates 13 for guided reciprocation therein. The pin 20 is prevented from being axially displaced by means of a washer 22 on each end held in place by cotter pins 23. The substantially central and longitudinally disposed links 18 pivotally connected to the pin 20, are in turn pivotally connected through said pin with the inner ends of links 24 which are of the design shown in Fig. 10. Each link 24 has an apertured inner portion 25 of reduced thickness contacting with the corresponding portion of the other link and on either side of the portions 25 are confronting recesses 26 accommodating the forward ends of the links 18 as pivotally connected to the pin 20 and projections 27 are provided having recesses 28 permitting sufficient relative angular movement between the links 24. The outer or free ends of the links 24 are thus medially located with respect to the thickness of the links, being of reduced thickness and accommodated between the bifurcations 29 of the arms 30 extending outwardly in angular relation to the jaws 31.

The links 24 are pivotally connected with the arms 30 by pins 32. The arms 30 are recessed at 5 to receive the compound pressure blocks or anvils 33 therebetween in such a position that they lie equally spaced from the respective side plates 13 and parallel therewith. The blocks 33 are pivotally mounted on a pin 6 and are spaced by spacing blocks 7. The jaws 31 are pivoted on pins 34 and are thus adapted to move toward and away from each other while the pressure blocks are held in position by engagement with the pins 34 as they move in the apertures 5 and are held from lateral movement by the spacers 7 which slide over the curved surfaces 8 of the jaws 31 adjacent the apertures 5. The blocks 33 are held with their pressure surfaces 9 in the plane of the bottom of recesses 35 in the side plates 13 at their front ends in a manner to accommodate the seal therein. The pivots 34 may be bolts similar to the bolts 12, the ends of which project into openings in the plates 13 and are held in place by nuts 36. This construction provides a jaw operating toggle mechanism by which great power may be applied to the jaws with the application of relatively small effort on the operating handles.

For the purpose of producing the desired seal, the jaws 31 are provided with overhanging and overlapping lips 37. That is, the lips of one jaw overlap or intermesh with those of the other jaw and extend into corresponding apertures 38. The jaws have forming portions 39 which engage the edges of the straps and press them inwardly and force them downwardly over the angularly disposed forming surfaces 40 of the pressure blocks 33 and fold them down onto the body of the strap, which in turn is forced downwardly onto the pressure surfaces 9, by the pressure of the faces 39' of the forming portions 39 which are being forced toward the pressure surface 9, faces 39' being so positioned on jaws 31 in relation to the pivotal mounting on pins 34 that the arc through which they swing is lessening the distance between faces 39' and pressure surfaces 9. As the straps are pressed onto the pressure surfaces 9, projections 41 on the blocks 33 are forced onto the central portion of the straps forming the depressions 42 in the seal as shown in Figs. 4 and 5.

In the use of the sealing tool it is placed over the object O to be bound by the band or strip S which has been arranged to encircle the object as indicated in Fig. 1. The ends of the band are arranged in overlapping relation without a sleeve. The handles 10 are then spread apart to position the toggle mechanism and jaws as indicated in Fig. 2 with the jaws in open position. The overlapping ends of the band are then engaged between the jaws as shown in Fig. 1 and the handles are moved together as indicated in Figs. 1 and 6. As the jaws close the overlapping lips 37 thereof will first underlie or engage beneath the overlapped band ends for holding the parts against relative movement. Further closing movement of the jaws while the ends are thus confined will cause the surfaces 39 to engage the opposite edges of the strap ends and fold the same over upon the body of the strap and faces 39' will then force the folded portion of the overlapped straps toward pressure surface 9, and cause the depression 42 to be formed in the body of the strap by the projections 41 on the pressure blocks.

As the handles 10 are moved toward each other, the arms 17 swing into angular relation between the side plates, thus shifting the links 18 forwardly and causing the pin 20 to move along in the slots 21 from the rear or inner ends thereof to the forward ends as shown in Fig. 6. This movement is transmitted to the jaws through the links 24, which are caused to move from a substantially right-angled position relative to each other to a position substantially in alignment, thus rocking the arms 30 outwardly and swinging the jaws 31 toward each other. Separation of the handles results in imparting opposite movement to the jaw operating toggle mechanism with the extensions or arms 17 projecting rearwardly of the side plates and the pin 20 moving rearwardly in the slots 21, thus drawing on the links 24 and swinging the arms 30 inwardly to spread the jaws 31 into such position that the tool may be applied to the band ends or removed therefrom after deforming the band ends in the manner above set forth in the formation of a seal.

By an inspection of Fig. 6 it will be noted that the space 45 between the pressure surfaces on the spacer blocks 7 and on the pressure blocks 33 and the faces 39' of the jaws as shown in Figs. 2 and 3 is substantially rectangular in cross section, being interrupted by the projections 41. It will thus be understood that the seal as shown in Figs. 4 and 5 is substantially rectangular in cross section for a distance longitudinally thereof equal to the width of the jaws 31, and that the edges of the strap ends are bent over and pressed down onto the body of the strap which is forced upon the projections 41 and the pressure surfaces 9 to form depressions therein and partially struck-out interlocking lugs which prevent relative longitudinal movement of the strap ends and form a permanent seal.

While we have described herein the preferred form of our invention, it will be understood that the same may be modified without departing from the principles thereof and we desire to avail ourselves of such modifications as come within the scope of the appended claims.

We claim as our invention:

1. In a sealing tool of the class described, a pair of individually pivoted confronting jaws, means for forcibly actuating said jaws toward each other, pressure blocks mounted between said jaws, said jaws comprising portions adapted to engage the edges of straps to be sealed together, fold them over and force the folded straps upon said pressure blocks, and a projection on said pressure blocks positioned in a manner to press into and cut the straps to interlock the straps together.

2. In a sealing tool of the class described, a pair of pivoted confronting jaws, means for forcibly actuating said jaws toward each other, spaced pressure blocks stationarily disposed between said jaws, forming portions on said jaws adapted to engage and deform the edges of straps placed therebetween, said pressure blocks comprising angularly disposed guiding portions for guiding the straps while they are being deformed, there being pressure surfaces on said blocks and projections between the pressure surfaces for interlocking portions of the straps.

3. In a sealing tool of the class described, a pair of pivoted opposed complementary jaws, means for actuating said jaws to closed position, pressure blocks stationarily disposed between said jaws, the ends of said blocks extending into recesses in said jaws and being accommodated therein as the jaws move, portions on said jaws engageable with straps placed therebetween for compressing the straps and depressing the same onto said pressure blocks, and projections on said pressure blocks disposed for forming interlocking portions along the longitudinal axis of the straps.

4. A sealing tool of the class described comprising supporting elements, confronting jaws pivoted to said elements, said jaws including spaced and aligned portions for engaging and deforming the edges of straps placed therebetween, a pressure block assembly mounted on said supporting elements between said jaws and positioned to receive and confine straps pressed thereagainst by said jaws, said assembly including portions with arcuately curved surfaces having sliding engagement with complementary curved surfaces on said jaws and portions engaging the pivots of the jaws to hold the assembly substantially stationary during the operation of the jaws.

5. A sealing tool of the class described comprising supporting elements, confronting jaws pivoted to said elements, said jaws including spaced and aligned portions for engaging and deforming the edges of straps placed therebetween, a pressure block assembly mounted on said supporting elements between said jaws and positioned to receive and confine straps pressed thereagainst by said jaws, said assembly including spaced pressure blocks and alternately positioned spacing blocks all of which have pressure surfaces disposed in substantially the same plane for engaging straps pressed thereon by said jaws, and means for maintaining each pressure block and each spacer block stationary.

6. A sealing tool of the class described comprising supporting elements, confronting jaws pivoted to said elements, said jaws including spaced and aligned portions for engaging and deforming the edges of straps placed therebetween, a pressure block assembly mounted on said supporting elements between said jaws and positioned to receive and confine straps pressed thereagainst by said jaws, said assembly including spaced pressure blocks and alternately positioned spacing blocks all of which have pressure surfaces disposed in substantially the same plane for engaging straps pressed thereon by said jaws, means for holding a pressure block stationary during the operation of said jaws, and separate means for holding a spacer block stationary during the operation of the jaws.

7. A sealing tool of the class described comprising supporting elements, confronting jaws pivoted to said elements, said jaws including spaced and substantially aligned portions for engaging and deforming the edges of straps placed therebetween, a pressure block assembly mounted on said supporting elements between said jaws and positioned to receive and confine straps pressed thereagainst by said jaws, said assembly including spaced pressure blocks and alternately positioned spacing blocks all of which have pressure surfaces disposed in substantially the same plane for engaging straps pressed thereon by said jaws, said spaced pressure blocks including forming portions laterally of the pressure surfaces, said forming portions having inclined strap guiding surfaces thereon, and projections between said strap guiding surfaces for deforming the strap on its longitudinal axis.

8. A sealing tool of the class described comprising supporting elements, confronting jaws pivoted to said elements, said jaws including spaced and substantially aligned portions for engaging and deforming the edges of straps placed therebetween, a pressure block assembly mounted on said supporting elements between said jaws and positioned to receive and confine straps pressed thereagainst by said jaws, said assembly including spaced pressure blocks and alternately positioned spacing blocks all of which have pressure surfaces for engaging straps pressed thereon by said jaws, and projections on and inwardly from the edges of said pressure blocks adapted to be pressed into the body of the straps to form conjoint deformations therein on the longitudinal axis of the straps.

9. A sealing tool of the class described comprising supporting elements, confronting jaws pivoted to said elements, said jaws including spaced and aligned portions for engaging and deforming the edges of straps placed therebetween, a pressure block assembly mounted on said supporting elements between said jaws and positioned to receive and confine straps pressed thereagainst by said jaws, said assembly including spaced pressure blocks and alternately positioned spacing blocks all of which have pressure surfaces disposed in the same plane for engaging straps pressed thereon by said jaws, said spaced pressure blocks including forming portions laterally of the pressure surfaces, said forming portions having inclined strap guiding surfaces thereon, and projections positioned centrally of said pressure blocks adapted to be pressed into the body of the straps to form conjoint deformations therein.

10. A sealing tool of the class described comprising supporting elements, confronting jaws pivoted to said elements, said jaws including spaced and aligned portions for engaging and deforming the edges of straps placed therebetween, a pressure block assembly mounted on said supporting elements between said jaws and positioned to receive and confine straps pressed thereagainst by said jaws, said assembly including spaced pressure blocks and alternately positioned spacing blocks all of which have pressure surfaces disposed in the same plane for engaging straps pressed thereon by said jaws, means for holding said assembly stationary during the operation of said jaws, and projections positioned centrally of said pressure blocks adapted to be pressed into the body of the straps to form conjoint deformations therein.

11. In a sealing tool of the class described comprising side plates, a pair of confronting deforming jaws individually pivoted between said side plates for cooperative action on metal straps placed between the jaws, a pressure block assembly disposed between said jaws, spaced deforming lugs on said jaws having compression surfaces and depressing surfaces thereon for folding the margins of straps placed therebetween and pressing them onto said pressure block assembly, means for holding said assembly stationary during the operation of the tool, confining and deforming portions on said assembly and means for actuating said jaws.

In witness whereof, we hereunto subscribe our names this 6th day of March, 1931.

JOHN M. McGREGOR.
ARVID ERICSSON.